US008739979B2

(12) United States Patent
Friemann et al.

(10) Patent No.: US 8,739,979 B2
(45) Date of Patent: Jun. 3, 2014

(54) BICYCLE SUPPORT

(71) Applicants: Brian K. Friemann, Woodbury, MN (US); Jay A. Johnson, Lake Elmo, MN (US)

(72) Inventors: Brian K. Friemann, Woodbury, MN (US); Jay A. Johnson, Lake Elmo, MN (US)

(*) Notice: Subject to any disclaimer, the term of this patent is extended or adjusted under 35 U.S.C. 154(b) by 0 days.

(21) Appl. No.: 13/650,219

(22) Filed: Oct. 12, 2012

(65) Prior Publication Data
US 2013/0092643 A1 Apr. 18, 2013

Related U.S. Application Data

(60) Provisional application No. 61/547,425, filed on Oct. 14, 2011.

(51) Int. Cl.
*A47F 7/04* (2006.01)

(52) U.S. Cl.
USPC ............................................ 211/19; 211/87.01

(58) Field of Classification Search
USPC .............. 211/19, 20, 23, 17, 18, 22, 5, 89.01; 248/316.2, 316.6
See application file for complete search history.

(56) References Cited

U.S. PATENT DOCUMENTS

| | | | | |
|---|---|---|---|---|
| 504,183 A * | 8/1893 | Stone et al. | .................... | 248/113 |
| 557,900 A * | 4/1896 | Shannon | ......................... | 70/234 |
| 582,086 A * | 5/1897 | Poole et al. | ..................... | 211/22 |
| 605,628 A * | 6/1898 | Bradley | ............................ | 211/5 |
| 613,963 A * | 11/1898 | Breininger | ...................... | 211/19 |
| 625,657 A * | 5/1899 | Elliot | ............................. | 604/104 |
| 636,629 A * | 11/1899 | Butcher | ............................ | 211/5 |
| 731,651 A * | 6/1903 | Allen | ............................... | 211/20 |
| D183,661 S * | 10/1958 | Reetz | ............................ | D12/115 |
| 3,682,523 A * | 8/1972 | Esposito | ........................ | 312/198 |
| 3,785,517 A * | 1/1974 | Brajkovich | ................... | 414/462 |
| 4,047,614 A | 9/1977 | Radek | | |
| 4,063,647 A * | 12/1977 | Blackmore | ...................... | 211/19 |
| D260,248 S * | 8/1981 | Gallagher | .................... | D12/115 |
| 4,352,432 A * | 10/1982 | Smith | ............................. | 211/19 |
| 4,416,379 A * | 11/1983 | Graber | ............................ | 211/19 |
| 4,465,196 A | 8/1984 | Erb | | |
| 4,830,167 A * | 5/1989 | Lassche | ........................ | 194/247 |
| 4,830,196 A | 5/1989 | Csanady | | |
| 5,036,986 A * | 8/1991 | Kral | ................................ | 211/22 |
| 5,078,277 A * | 1/1992 | Tschritter | ....................... | 211/20 |
| 5,246,120 A * | 9/1993 | Walker | ............................ | 211/19 |
| 5,267,657 A * | 12/1993 | McGuiness et al. | ............ | 211/22 |
| 5,549,231 A * | 8/1996 | Fletcher et al. | ................ | 224/536 |
| 5,653,890 A * | 8/1997 | Arato et al. | ........................ | 211/5 |
| 5,702,007 A * | 12/1997 | Fritz et al. | ........................ | 211/17 |
| 5,743,411 A | 4/1998 | Hawkes | | |
| 6,755,309 B1 * | 6/2004 | Runge | ............................. | 211/20 |
| 8,061,499 B2 * | 11/2011 | Khairallah et al. | ............ | 194/211 |
| 2006/0237376 A1 * | 10/2006 | Eakin | ............................... | 211/20 |
| 2011/0037240 A1 * | 2/2011 | Kritzer et al. | ................... | 280/293 |

* cited by examiner

*Primary Examiner* — Jonathan Liu
*Assistant Examiner* — Stanton L Krycinski
(74) *Attorney, Agent, or Firm* — Brooks, Cameron & Huebsch, PLLC

(57) ABSTRACT

A bicycle support that when attached to a vertical surface can support a wheel of a bicycle upright and support the bicycle upright with the wheels of the bicycle resting on a horizontal surface. The bicycle support has opposed projections having support parts between which the tire and rim of a bicycle can be received and supported, retaining parts to help retain the tire of the bicycle between the support parts, and guide parts for guiding a tire between the retaining parts and to a position between the support parts. The distance between the support parts is adjustable to support bike wheels with different width tires, and the projections are positioned at an angle with respect to the surface to which the bicycle support is attached that allows the entire bicycle engaged with the bicycle support to be positioned closely adjacent the surface to which the bicycle support is attached.

3 Claims, 2 Drawing Sheets

BICYCLE SUPPORT

This application claims priority to U.S. Provisional Application 61/547,425 filed Oct. 14, 2011, the specification of which is incorporated herein by reference.

FIELD OF THE INVENTION

The present invention relates to supports adapted to support a wheel of a bicycle upright and thereby support the bicycle upright with the wheels of the bicycle resting on a horizontal surface below the supports.

BACKGROUND

The prior art is replete with descriptions of supports adapted to support a wheel of a bicycle upright and thereby support the bicycle upright with the wheels of the bicycle resting on a horizontal surface below the supports. U.S. Pat. Nos. 4,047,614, 4,465,196, 4,830,196, and 5,743,411 provide examples. While those examples may provide such supports, they are either not as low cost and/or do not afford storing the bicycle closely along a surface at which the support is located.

DISCLOSURE OF THE INVENTION

The present invention provides an inexpensive bicycle support that can be attached to a vertical surface (e.g., the inside surface of a wall of a garage) and can support a wheel of a bicycle upright and thereby support the bicycle upright with the wheels of the bicycle resting on a horizontal surface below the support (e.g., on the garage floor). The bicycle support according to the present invention is easy for a bicycle to engage with or disengage from, and allows a bicycle engaged with it to be positioned closely adjacent the surface of a wall to which the support is attached to minimize the distance the engaged bicycle projects away from that surface, thereby restricting its interference with other items stored nearby (e.g., an automobile).

The bicycle support according to the present invention comprises first and second stiff resiliently flexible projections. Each of the projections comprises (1) a support part having a straight first edge, an opposite second edge, and a support surface between its first and second edges, (2) a retaining part having a first edge along the second edge of the support part and having an opposite second edge, the retaining part projecting above the support surface of the support part along the second edge of the support part and having a retaining surface adjacent the support surface of the support part, the first edge of the retaining part being spaced greater than about 1.5 inches (3.8 cm) (e.g., 2.25 inches or 5.7 cm) from the first edge of the support part, and (3) a guide part along the second edge of the retaining part that has a guide surface diverging away from the retaining surface of the retaining part.

The bicycle support further comprises mounting means for (1) mounting the projections from along the first edges of their support parts with the support and retaining surfaces of their support and retaining parts parallel to and generally opposed to each other and the support surfaces of the support parts at a fixed distance selected to be closely spaced from or to contact the opposite sides of a tire on the wheel of a bicycle to be supported; for (2) affording attachment of the support parts to a vertical surface with the first edges of the opposed support parts extending generally vertically upwardly and the center of those first edges at a distance dimension above a horizontal surface below the bicycle support that is about equal to the radius dimension of a bicycle wheel the bicycle support is adapted to support; and for (3) positioning the support surfaces of the support parts of the projections at an angle generally in the range of about 30 to 60 degrees (e.g. 45 degrees) with respect to a vertical surface to which the bicycle support is attached.

In use with the projections properly attached by the mounting means to a vertical surface such as the inner wall surface of a garage, the wheel of a bicycle (typically the front wheel) for which the spacing between the support parts is appropriate can be moved between the support parts until the tire of the wheel is in an engaged position between the opposed support surfaces. At that engaged position of the tire the support surfaces of the projections are contacting or very close to the opposite sides of the tire to support the bicycle wheel upright and thereby support the bicycle upright with its wheels resting on the horizontal surface below the bicycle support (i.e., the floor of the garage). Such movement of the wheel between the projections will be facilitated by the guide surfaces of the guide parts that cause the tire on the wheel to compress and/or resiliently flex the projections away from each other so that the tire and rim of the wheel can first pass between the opposed retaining surfaces of the retaining parts (which are normally spaced more closely than the support surfaces), and then move to a position between the support surfaces. After the tire on the bicycle wheel is between the support surfaces, the opposed retaining parts will restrict removal of the tire from between the support surfaces until a small force is applied to cause the tire to again compress and/or resiliently flex the projections apart so that the tire can pass between the retaining parts and out of the bicycle support.

Having the support surfaces of the support parts at an angle generally in the range of about 30 to 60 degrees (e.g. 45 degrees) with respect to a vertical surface to which the bicycle support is attached restricts the distance a wheel of a bicycle engaged with the bicycle support projects away from the surface to which the bicycle support is attached and allows the rear portion of that bicycle to be closely spaced from that surface to restrict its projection away from that surface and its potential interference with other adjacent objects (e.g., an automobile that may also be stored along that surface in a garage).

The mounting means can also include adjustment means for allowing the fixed distance between the support surfaces of the support parts to be changed, thereby facilitating supporting within the bicycle support bike wheels with tires of different widths (e.g., either mountain bike tires or road bike tires). To provide that adjustment means the bicycle support can be made in two portions, a first portion including the first projection and a first base portion, and a second portion including the second projection and a second base portion. The first base portion can be rigidly attached along an edge to the first projection along the first edge of the first projection and can have a planar rear surface adapted to be positioned along a vertical surface to which the bicycle support is to be attached and an opposite front surface. The second base portion can be rigidly attached along one edge to the second projection along the first edge of the second projection and can have a rear surface positionable along the front surface of first base portion with the support and retaining surfaces of the first and second projections opposed to each other by means that allow the fixed distance between the support surfaces of the first and second support parts to be adjusted to fit the width of the tire of a specific bicycle wheel by changing (if necessary) the position of the second base portion with respect to the first base portion, and then attaching the base portions together.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
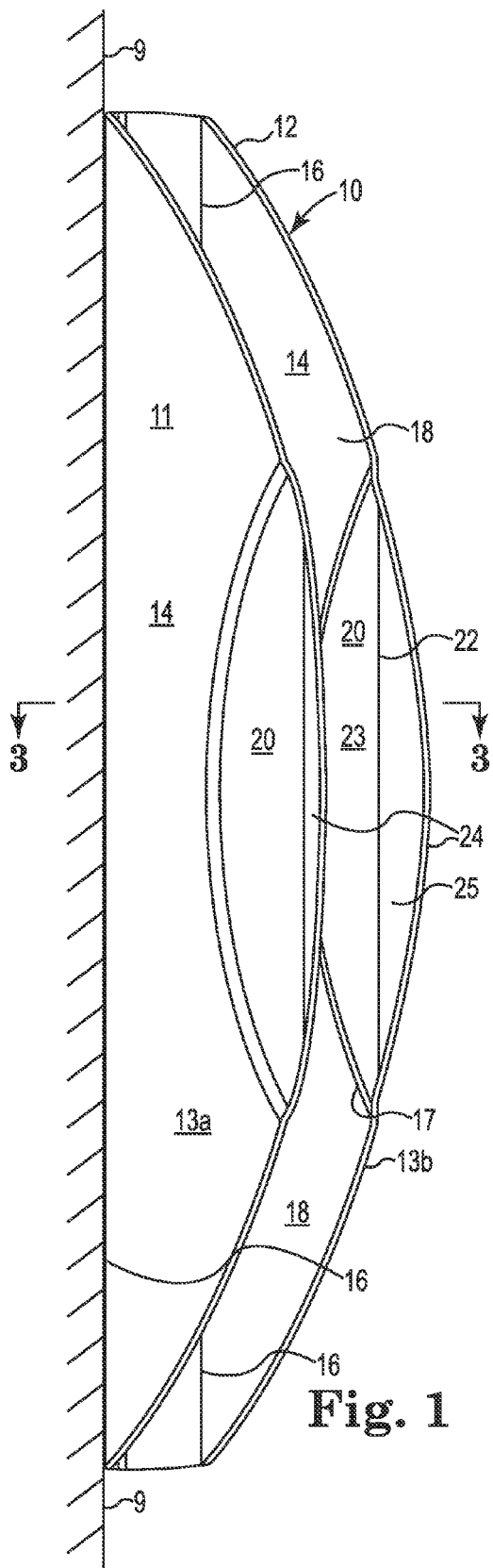
FIG. 1 is a vertical side view of a bicycle support according to the present invention shown attached to a vertical surface.
Figure 2:
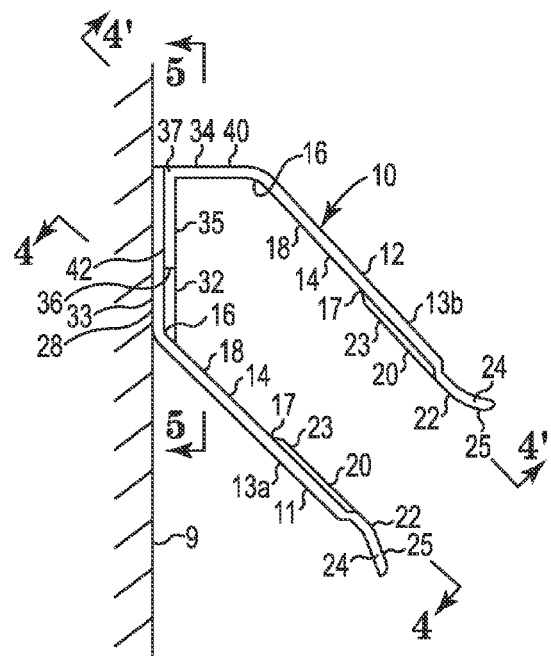
FIG. 2 is a top view of the bicycle support and vertical surface of FIG. 1.
Figure 3:
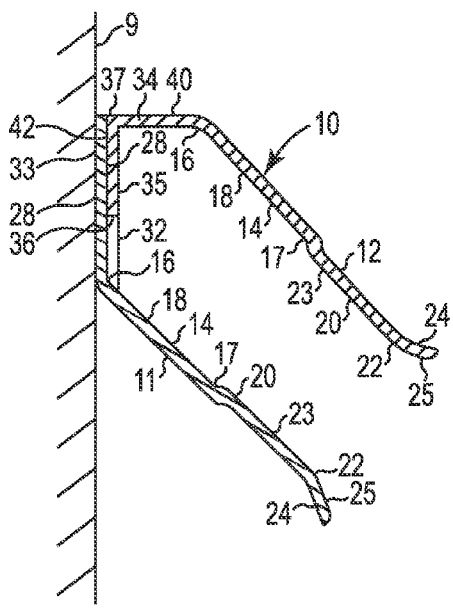
FIG. 3 is a sectional view taken approximately along line 3-3 of FIG. 11.
Figure 4:
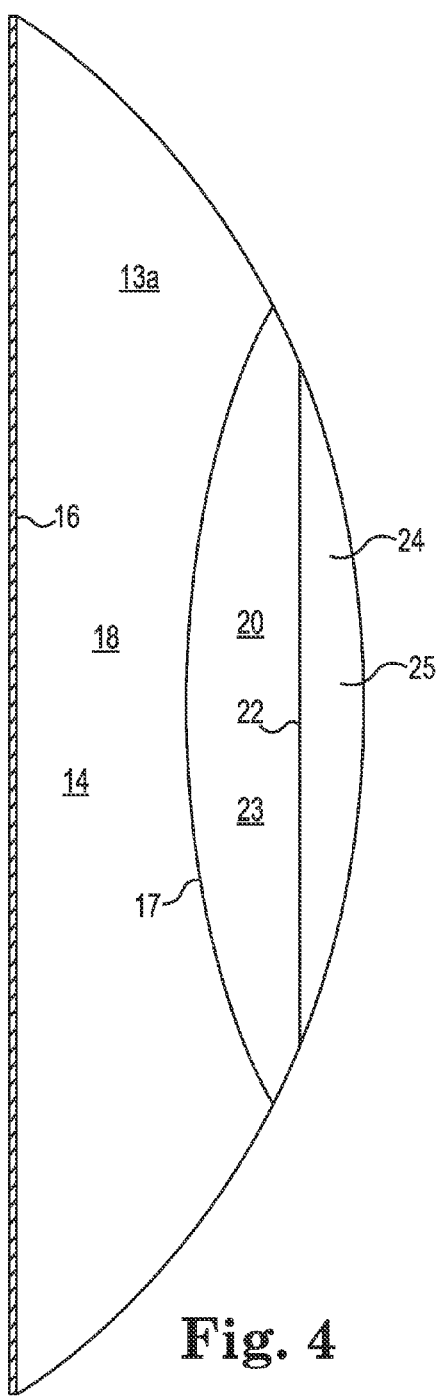
FIG. 4 is a sectional view taken approximately along line 4-4 of FIG. 2, which view is essentially the same as a view taken along lines 4'-4' of FIG. 2.
Figure 5:
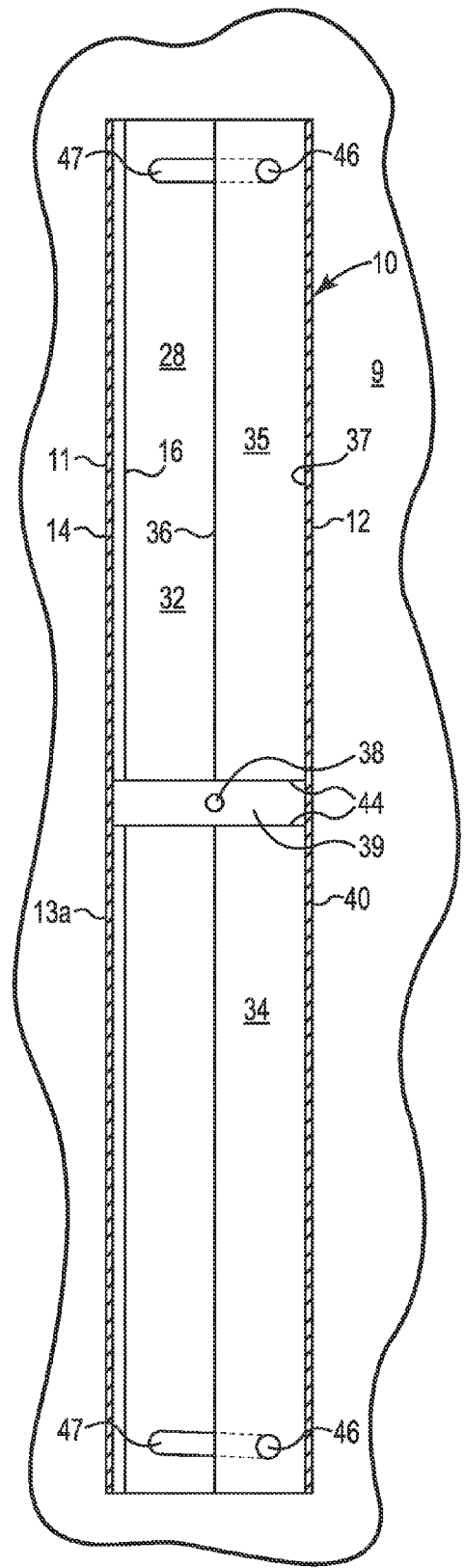
FIG. 5 is a sectional view taken approximately along line 5-5 of FIG. 2.

With reference to the Drawing, there is illustrated a bicycle support according to the present invention adapted to be attached to a vertical surface (surface 9 as illustrated), and then to support the front wheel of a bicycle (not shown) upright and thereby support the bicycle upright with its wheels resting on a horizontal surface (not shown) below the bicycle support 10.

Generally, the bicycle support 10 comprises first and second portions 11 and 12, each of which portions 11 and 12 is an integral molding of a stiff resiliently flexible polymeric material (e.g., polyethylene). Each of the portions 11 and 12 includes a projection 13a and 13b respectively. Each of the first and second projections 13a and 13b comprises a support part 14 having a straight first inner edge 16, having an opposite second outer edge 17 with an arcuate concave central portion between arcuate convex end portions, having a generally uniform thickness (e.g, 0.2 inch or 0.5 cm), and having a planar inner support surface 18 between its edges 16 and 17. Each of the projections 13a and 13b also includes a retaining part 20 having a first edge along the outer edge 17 of the support part 14 and having an opposite straight outer edge 22. The retaining part 20 has a planar inner retaining surface 23 that projects above the support surface 18 of the support part 14 along the outer edge 17 of the support part 14 (e.g. by a distance in the range of 0.1 to 0.3 inches (0.25 to 0.76 cm) and preferably about 0.1 inch. The outer edge 17 of the support part 14 is spaced greater than about 1.5 inches (3.8 cm) and preferably about 2.25 inches (5.7 cm) from the inner edge 16 of the support part 14 to provide a distance there between for the support surface 18 that will receive the radial thickness of the tires and rims of most bicycles that the bicycle support 10 is likely to receive.

Mounting means included in the bicycle support 10 (later to be explained) supports the projections 13a and 13b with their support surfaces 18 generally opposed and spaced apart a distance that is closely spaced from or contacts the opposite sides of a bicycle tire that the bicycle support 10 is adapted to receive. Thus, the bicycle support 10 can support that tire upright when the bicycle support 10 is mounted on a vertical surface with the first edges 16 of the support parts 14 extending vertically upwardly and the centers of the edges 16 at a height dimension above a horizontal surface below on which that tire will rest that is about the same as the radius dimension of that tire. The retaining surfaces 23 of the opposed retaining parts 20 are then spaced slightly closer together (e.g., 0.10 inch or 0.25 cm) to require slight compression of that tire and/or resilient separation of the projections 13a and 13b for that tire to pass between them. This restricts movement of the tire in and out of the bicycle support 10 until a person applies a small force to insert or remove the tire. Each of the projections 13a and 13b additionally includes a guide part 24 attached to its retaining part 20 along its outer edge 22 and having a planar guide surface 25 diverging away from its retaining surface 23. The guide surface 25 on each projection 13a and 13b extends past an imaginary plane lying along the planar support surface 18 of that projection 13a or 13b so that it will receive and guide the tire of a bicycle between the projections 13a and 13b as that tire is moved into the bicycle support 10.

The portions 11 and 12 of the bicycle support 10 further each include a base, 28 and 34 respectively. The bases 28 and 34 of the bi cycle support 10 provide the mounting means for (1) mounting the projections 13a and 13b with their support and retaining surfaces 18 and 23 generally opposed to and parallel to each other and the support surfaces 18 of their support parts 14 at a fixed distance from each other, for (2) affording attachment of the projections 13a and 13b to a vertical surface with the first edges 16 of their opposed support parts 14 extending generally vertically upwardly and the center of those first edges 16 at a distance dimension above a horizontal surface below the bicycle support 10 that is about equal to the radius dimension of a bicycle wheel the bicycle support 10 is adapted to support on that horizontal surface, and for (3) positioning the support surfaces 18 of the support parts 14 at an angle generally in the range of about 30 to 60 degrees (e.g., 45 degrees) with respect to a vertical surface (e.g., the surface 9) to which the bicycle support 10 is attached. The bases 28 and 34 also include adjustment means for allowing the fixed distance between the support surfaces 18 of the support parts 14 to be changed, thereby allowing the bicycle support 10 to be adjusted to receive and support bicycle tires of different widths.

The first base 28 on the first portion 11 is elongate, rectangular and plate-like and has opposite elongate edges extending between its opposite ends. The first base 28 is attached along a second one of its elongate edges to the support part 14 of the first projection 13a along its first edge 16. The first base 28 has a planar front surface 32 and a parallel opposite planar rear surface 33 adapted to be positioned along a planar vertical surface (e.g., the surface 9) on which the bicycle support 10 is to be mounted. Both its front and rear surfaces 32 and 33 are disposed at an angle in the range of 30 to 60 degrees (e.g., 45 degrees) with respect to the support surface 18 of the support part 14 of the first projection 13a. The first base 28 is adapted to be attached to a planar vertical surface (e.g., the surface 9) with the first edge 16 of the projection 13a extending generally vertically upwardly and the center of that first edge 16 at a distance dimension above a horizontal surface below the bicycle support 10 that is about equal to the radius dimension of a bicycle wheel the bicycle support 10 is adapted to support. Such attachment can be partially provided by inserting a wood screw (not shown) through a central bore 38 in an elongate rectangular raised bar 39 extending transversely across the middle of the front surface 32, which bar 39 provides part of the adjustment means for changing the fixed distance between the support surfaces 18 of the projections 13a and 13b as will later be explained.

The mounting means also includes a second elongate base 34 on the second portion 12. The second elongate base 34 includes a first planar elongate rectangular plate-like part 35 having opposite first and second longitudinal edges 36 and 37 extending between its opposite ends, and a second planar rectangular elongate plate like part 40 also having opposite first and second longitudinal edges. The second plate like part 40 is attached to the first plate-like part 35 along the second longitudinal edge 37 of the first part 35 and the first longitudinal edge of the second part 40 with the surfaces of the parts 35 and 40 disposed at a right angle with respect to each other. The second part 40 is attached to the support part 14 of the second projection 13*b* along the longitudinal edge opposite the first part 35 of the second part 40 and the first edge 16 of the second projection 13*b*. A planar rear surface 42 of the first part 35 of the second base 34 is adapted to be positioned along the planar front surface 32 of the first base 28 with the bar 39 on the first base part 28 in a transverse slot 44 midway along the first part 35 and the rear surface 42 of the first part 35 is disposed with respect to the support surface 18 of the support part 14 of the second projection 13*b* at the same angle described above between the rear surface 33 of the first base 28 and the support surface 18 of the first projection 13*a* to position the support surfaces 18 of the first and second projections 13*a* and 13*b* parallel to and generally opposed to each other when the planar rear surface 42 of the first part 35 of the second base 34 is positioned along the planar front surface 32 of the first base 28.

To attach and assemble the bicycle support 10, first the first base 28 of the first portion 11 is attached (by inserting a wood screw through the central bore 38 in the bar 39) to a planar vertical surface (e.g., the surface 9) with the first edge 16 of the first projection 13*a* extending generally vertically upwardly and the center of the first edge 16 of that projection 13*a* at a distance dimension above a horizontal surface below the bicycle support 10 that is about equal to the radius dimension of a bicycle wheel the bicycle support 10 is adapted to support. Next, the rear surface 42 of the first part 35 of the second base 34 on the second portion 12 is positioned along the planar front surface 32 of the first base part 28 with the bar 39 in the transverse slot 44 across the first part 35 of the second base 34. The base 34 of the second portion 12 is then slid transversely along the bar 39 in either direction to obtain a desired distance between the support surfaces 18 of the projections 13*a* and 13*b* on the first and second portions 11 and 12 corresponding to the width of the tire on the bicycle the bicycle support 10 is intended to receive. The second portion 12 is then attached to the planar vertical surface and to the first portion 11 by inserting screws through bores 46 at the opposite ends of the first part 35 of the second base 34 and transverse slots 47 aligned with the bores 46 at opposite ends of the first base 28.

As an example of useful sizes for the bicycle support 10, the inner edges 16 of the first and second projections 13*a* and 13*b* are about 20 inches (50.8 cm) long, the outer edges 17 of the support parts 14 at their midpoints are spaced from those inner edges 16 by about 2.25 inches (5.7 cm), the second edges 22 of the retaining parts 20 are spaced from those inner edges 16 by about 3.75 inches (9.5 cm), the guide surfaces 25 are about 0.75 inch (1.9 cm) wide at their midpoints and diverge at an angle of about 25 degrees with respect to their support surfaces 18, the first base 28 is 2.125 inch (5.4 cm) wide, the first and second plate-like parts 35 and 40 of the second base 34 are both about 1 inch (2.54 cm) wide and the thicknesses of the projections 13*a* and 13*b* and bases 28 and 34 are all about 0.2 inch (0.5 cm) except for being thicker (about 0.275 inch or 0.7 cm) at the junctions between the support parts 14 and the retaining parts 20.

The present invention has now been described with reference to one embodiment thereof. It will be apparent to those skilled in the art that many changes can be made in the embodiment described without departing from the scope of the present invention. For non-limiting examples, the support surfaces 18 could be concave to generally correspond the side surfaces of tires they are intended to support; and/or a bicycle support intended for use with bicycle tires of a single width or narrow range of widths could be made by making a single base for supporting both of the projections 13*a* and 13*b*. Thus, the scope of the present invention should not be limited to the structure described in this application, but only by the structures described by the language of the claims and the equivalents thereof.

What is claimed is:

1. A bicycle support that can be attached to a vertical surface and can support a wheel of a bicycle upright and thereby support the bicycle upright with the wheels of the bicycle resting on a horizontal surface below the bicycle support, said bicycle support comprising first and second stiff resiliently flexible projections each comprising:

a support part having a straight first edge, an opposite second edge, and a generally planar support surface between said first and second edges;

a retaining part having a first edge along the second edge of said support part and having an opposite second edge, said retaining part projecting from the support surface of said support part along the second edge of said support part and having a retaining surface adjacent the support surface of said support part, the second edge of said retaining part being spaced greater than about 1.5 inches (3.8 cm) from the first edge of said support part; and a guide part along the second edge of said retaining part, said guide part including a central portion having a guide surface diverging away from the retaining surface of said retaining part past an imaginary plane along the support surface of said support part, said bicycle support further comprises:

mounting means for mounting the projections from along the first edges of said support parts with the support and retaining surfaces of said support parts and retaining parts parallel to and generally opposed to each other at a fixed distance apart selected such that the support surfaces of the support parts are closely adjacent to or in contact with the opposite sides of a tire on the wheel of a bicycle to be supported by the bicycle support, said support parts attached to a vertical surface with the first edges of the support parts extending generally vertically upwardly and the center of said first edges of said support parts at a distance dimension above a horizontal surface below the bicycle support that is about equal to the radius dimension of a bicycle wheel the bicycle support is adapted to support; and means for positioning the support surfaces of said support parts of said projections at an angle generally in the range of about 30 to 60 degrees with respect to said vertical surface to which the bicycle support is to be attached, including a first base having opposite first and second edges extending between opposite ends with said first base along said second edge being attached to the first projection along the first edge of the support part of said first projection, said first base having a front surface, and a planar rear surface adapted to be positioned along said vertical surface, said first base being adapted to be attached to the vertical surface with said edges of said first base extending generally vertically upwardly; and said second projection including a second base having opposite first and second edges extending between opposite ends with said second edge of said second base rigidly attached to the first edge of said second projection, a front surface, and a rear surface adapted to be positioned along the front surface of the first base; and said mounting means for mounting said projections includes means for changing said fixed distance between said support surfaces of said support parts, one of said first base or second base having a transverse projecting bar and the other of said first base or second base having surfaces adapted to slide along the bar to provide part of said means for changing said fixed distance between said support surfaces of said support parts.

2. The bicycle support according to claim 1, wherein said mounting means positions the support surfaces of the support parts of said projections at an angle of about 45 degrees with respect to said vertical surface to which the bicycle support is to be attached.

3. The bicycle support according to claim 1, wherein said bicycle support has first and second portions, said first portion including said first projection and said first base, and said second portion including said second projection and said second base, said first base is rigidly attached along said first edge of said first projection; and wherein said means for changing said fixed distance between said support surface of said support parts is adjusted to fit the width of the tire of a specific bicycle wheel by changing the position of the second base with respect to the first base, and then attaching the first and second base together.

\* \* \* \* \*